United States Patent
Preisler et al.

(10) Patent No.: US 9,707,725 B2
(45) Date of Patent: *Jul. 18, 2017

(54) METHOD OF MAKING A SANDWICH-TYPE, COMPRESSION-MOLDED, COMPOSITE COMPONENT HAVING A CELLULOSE-BASED CORE AND IMPROVED SURFACE APPEARANCE

(71) Applicant: GLOBAL IP HOLDINGS, LLC, Sterling Heights, MI (US)

(72) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 167 days.

This patent is subject to a terminal disclaimer.

(21) Appl. No.: 14/603,430

(22) Filed: Jan. 23, 2015

(65) Prior Publication Data

US 2015/0130105 A1   May 14, 2015

Related U.S. Application Data

(63) Continuation-in-part of application No. 13/762,956, filed on Feb. 8, 2013.

(51) Int. Cl.
*B29C 43/18* (2006.01)
*B29C 70/46* (2006.01)
(Continued)

(52) U.S. Cl.
CPC ............... *B29C 70/46* (2013.01); *B29C 43/18* (2013.01); *B29C 43/10* (2013.01);
(Continued)

(58) Field of Classification Search
CPC ....... B29C 43/10; B29C 70/345; B29C 70/46; B29C 2043/182; B29C 2043/563
See application file for complete search history.

(56) References Cited

U.S. PATENT DOCUMENTS 3,568,254 A   3/1971   Stolki
3,651,563 A   3/1972   Volkmann
(Continued)

OTHER PUBLICATIONS

Office Action; U.S. Appl. No. 13/762,956; notification date Apr. 17, 2015.

(Continued)

*Primary Examiner* — Matthew Daniels
(74) *Attorney, Agent, or Firm* — Brooks Kushman P.C.

(57) ABSTRACT

A method of making a sandwich-type, compression-molded, composite component having improved surface appearance is provided. Reinforced thermoplastic skins, first and second sheets of thermoplastic adhesive and a cellulose-based core of a blank or stack of sandwich materials are heated to a softening temperature of the thermoplastics. The heated blank or stack is allowed to cool in the mold cavity until inner surfaces of the skins are bonded to top and bottom surfaces of the core by the sheets to seal core cavities. Air in the sealed cavities urges softened portions of the sheets and portions of the core inwardly towards the cavities of the core as the air in the cavities cools to inhibit debossing and improve surface appearance of a first outer surface of the blank or stack.

17 Claims, 4 Drawing Sheets

(51) Int. Cl.
  *B29K 23/00* (2006.01)
  *B29L 7/00* (2006.01)
  *B29C 43/10* (2006.01)
  *B29C 43/56* (2006.01)

(52) U.S. Cl.
  CPC .. *B29C 2043/182* (2013.01); *B29C 2043/563* (2013.01); *B29K 2023/12* (2013.01); *B29L 2007/002* (2013.01)

(56) References Cited

U.S. PATENT DOCUMENTS

| | | |
|---|---|---|
| 3,750,525 A | 8/1973 | Waters et al. |
| 3,955,266 A | 5/1976 | Honami et al. |
| 4,175,995 A | 11/1979 | Walter |
| 4,204,822 A | 5/1980 | Hewitt |
| 4,550,854 A | 11/1985 | Schellenberg |
| 4,717,612 A | 1/1988 | Shackelford |
| 4,836,380 A | 6/1989 | Walter et al. |
| 4,941,785 A | 7/1990 | Witten |
| 5,022,943 A * | 6/1991 | Zaima ............... B29D 24/005 156/221 |
| 5,026,445 A | 6/1991 | Mainolfi et al. |
| 5,074,726 A | 12/1991 | Betchel et al. |
| 5,143,778 A | 9/1992 | Shuert |
| 5,198,175 A | 3/1993 | Kato et al. |
| 5,217,563 A | 6/1993 | Niebling et al. |
| 5,253,962 A | 10/1993 | Close, Jr. |
| 5,298,694 A | 3/1994 | Thompson et al. |
| 5,316,604 A | 5/1994 | Fell |
| 5,370,521 A | 12/1994 | McDougall |
| 5,417,179 A | 5/1995 | Niemier et al. |
| 5,423,933 A | 6/1995 | Horian |
| 5,474,008 A | 12/1995 | Vespoli et al. |
| 5,502,930 A | 4/1996 | Burkette et al. |
| 5,534,097 A | 7/1996 | Fasano et al. |
| 5,683,782 A | 11/1997 | Duchene |
| 5,700,050 A | 12/1997 | Gonas |
| 5,744,210 A | 4/1998 | Hofmann et al. |
| 5,750,160 A | 5/1998 | Weber et al. |
| 5,911,360 A | 6/1999 | Schellenberg |
| 5,915,445 A | 6/1999 | Rauenbusch |
| 5,928,735 A | 7/1999 | Padmanabhan et al. |
| 5,979,962 A | 11/1999 | Valentin et al. |
| 6,050,630 A | 4/2000 | Hochet |
| 6,066,217 A | 5/2000 | Dibble et al. |
| 6,102,464 A | 8/2000 | Schneider et al. |
| 6,102,630 A | 8/2000 | Flolo |
| 6,280,551 B1 | 8/2001 | Hilligoss |
| 6,435,577 B1 | 8/2002 | Renault |
| 6,537,413 B1 | 3/2003 | Hochet et al. |
| 6,546,694 B2 | 4/2003 | Clifford |
| 6,615,762 B1 | 9/2003 | Scott |
| 6,631,785 B2 | 10/2003 | Khambete et al. |
| 6,655,299 B2 | 12/2003 | Preisler et al. |
| 6,659,223 B2 | 12/2003 | Allison et al. |
| 6,682,675 B1 | 1/2004 | Vandangeot et al. |
| 6,682,676 B1 | 1/2004 | Renault et al. |
| 6,748,876 B2 | 6/2004 | Preisler et al. |
| 6,752,443 B1 | 6/2004 | Thompson et al. |
| 6,790,026 B2 | 9/2004 | Vandangeot et al. |
| 6,793,747 B2 | 9/2004 | North et al. |
| 6,823,803 B2 | 11/2004 | Preisler |
| 6,825,803 B2 | 11/2004 | Wixforth et al. |
| 6,843,525 B2 | 1/2005 | Preisler |
| 6,890,023 B2 | 5/2005 | Preisler et al. |
| 6,905,155 B1 | 6/2005 | Presley et al. |
| 6,926,348 B2 | 8/2005 | Krueger et al. |
| 6,945,594 B1 | 9/2005 | Bejin et al. |
| 6,981,863 B2 | 1/2006 | Renault et al. |
| 7,014,259 B2 | 3/2006 | Heholt |
| 7,059,646 B1 | 6/2006 | DeLong et al. |
| 7,059,815 B2 | 6/2006 | Ando et al. |
| 7,090,274 B1 | 8/2006 | Khan et al. |
| 7,093,879 B2 | 8/2006 | Putt et al. |
| 7,121,128 B2 | 10/2006 | Kato et al. |
| 7,121,601 B2 | 10/2006 | Mulvihill et al. |
| 7,188,881 B1 | 3/2007 | Sturt et al. |
| 7,204,056 B2 | 4/2007 | Sieverding |
| 7,207,616 B2 | 4/2007 | Sturt |
| 7,222,915 B2 | 5/2007 | Philippot et al. |
| 7,264,685 B2 | 9/2007 | Katz et al. |
| 7,320,739 B2 | 1/2008 | Thompson, Jr. et al. |
| 7,393,036 B2 | 7/2008 | Bastian et al. |
| 7,402,537 B1 | 7/2008 | Lenda et al. |
| 7,419,713 B2 | 9/2008 | Wilkens et al. |
| 7,530,322 B2 | 5/2009 | Angelini |
| 7,628,440 B2 | 12/2009 | Bernhardsson et al. |
| 7,713,011 B2 | 5/2010 | Orszagh et al. |
| 7,837,009 B2 | 11/2010 | Gross et al. |
| 7,854,211 B2 | 12/2010 | Rixford |
| 7,909,379 B2 | 3/2011 | Winget et al. |
| 7,918,313 B2 | 4/2011 | Gross et al. |
| 7,919,031 B2 | 4/2011 | Winget et al. |
| 7,942,475 B2 | 5/2011 | Murray |
| 7,963,243 B2 | 6/2011 | Quigley |
| 8,052,237 B2 | 11/2011 | Althammer et al. |
| 8,062,762 B2 | 11/2011 | Stalter |
| 8,069,809 B2 | 12/2011 | Wagenknecht et al. |
| 8,117,972 B2 | 2/2012 | Winget et al. |
| 8,133,419 B2 | 3/2012 | Burks et al. |
| 8,262,968 B2 | 9/2012 | Smith et al. |
| 8,298,675 B2 | 10/2012 | Alessandro et al. |
| 8,316,788 B2 | 11/2012 | Willis |
| 8,475,884 B2 | 7/2013 | Kia |
| 8,622,456 B2 | 1/2014 | Preisler et al. |
| 8,651,549 B2 | 2/2014 | Raffel et al. |
| 8,690,233 B2 | 4/2014 | Preisler et al. |
| 8,764,089 B2 | 7/2014 | Preisler et al. |
| 8,795,465 B2 | 8/2014 | Preisler et al. |
| 8,795,807 B2 | 8/2014 | Preisler et al. |
| 8,808,827 B2 | 8/2014 | Preisler et al. |
| 8,808,828 B2 | 8/2014 | Preisler et al. |
| 8,808,829 B2 | 8/2014 | Preisler et al. |
| 8,808,830 B2 | 8/2014 | Preisler et al. |
| 8,808,831 B2 | 8/2014 | Preisler et al. |
| 8,808,833 B2 | 8/2014 | Preisler et al. |
| 8,808,834 B2 | 8/2014 | Preisler et al. |
| 8,808,835 B2 | 8/2014 | Preisler et al. |
| 8,834,985 B2 | 9/2014 | Preisler et al. |
| 8,852,711 B2 | 10/2014 | Preisler et al. |
| 8,859,074 B2 | 10/2014 | Preisler et al. |
| 8,883,285 B2 | 11/2014 | Preisler et al. |
| 9,302,315 B2 | 4/2016 | Verbeek et al. |
| 9,364,975 B2 | 6/2016 | Preisler et al. |
| 2004/0078929 A1 | 4/2004 | Schoemann |
| 2005/0189674 A1 | 9/2005 | Hochet et al. |
| 2006/0008609 A1 | 1/2006 | Snyder et al. |
| 2006/0185866 A1 | 5/2006 | Jeong et al. |
| 2006/0121244 A1 | 6/2006 | Godwin et al. |
| 2006/0255611 A1 | 11/2006 | Smith et al. |
| 2007/0065264 A1 | 3/2007 | Sturt et al. |
| 2007/0069542 A1 | 3/2007 | Steiger et al. |
| 2007/0256379 A1 | 11/2007 | Edwards |
| 2007/0258786 A1 | 11/2007 | Orszagh et al. |
| 2008/0169678 A1 | 7/2008 | Ishida et al. |
| 2008/0193256 A1 | 8/2008 | Neri |
| 2008/0185866 A1 | 11/2008 | Jeong et al. |
| 2009/0108639 A1 | 4/2009 | Sturt et al. |
| 2010/0026031 A1 | 2/2010 | Jouraku |
| 2010/0086728 A1 | 4/2010 | Theurl et al. |
| 2010/0170746 A1 | 7/2010 | Restuccia et al. |
| 2010/0206467 A1 | 8/2010 | Durand et al. |
| 2011/0260359 A1 | 10/2011 | Durand et al. |
| 2011/0315310 A1 | 12/2011 | Trevisan et al. |
| 2012/0247654 A1 | 10/2012 | Piccin et al. |
| 2012/0315429 A1 | 12/2012 | Stamp et al. |
| 2013/0031752 A1 | 2/2013 | Davies |
| 2013/0075955 A1 | 3/2013 | Piccin et al. |
| 2013/0137798 A1 | 5/2013 | Piccin |
| 2013/0278002 A1 | 10/2013 | Preisler et al. |
| 2013/0278003 A1 | 10/2013 | Preisler et al. |
| 2013/0278007 A1 | 10/2013 | Preisler et al. |
| 2013/0278008 A1 | 10/2013 | Preisler et al. |

(56) References Cited

U.S. PATENT DOCUMENTS

| | | |
|---|---|---|
| 2013/0278009 A1 | 10/2013 | Preisler et al. |
| 2013/0278015 A1 | 10/2013 | Preisler et al. |
| 2013/0278018 A1 | 10/2013 | Preisler et al. |
| 2013/0278019 A1 | 10/2013 | Preisler et al. |
| 2013/0278020 A1 | 10/2013 | Preisler et al. |
| 2013/0280459 A1 | 10/2013 | Nakashima et al. |
| 2013/0280469 A1 | 10/2013 | Preisler et al. |
| 2013/0280472 A1 | 10/2013 | Preisler et al. |
| 2013/0312652 A1 | 11/2013 | Preisler et al. |
| 2013/0316123 A1 | 11/2013 | Preisler et al. |
| 2013/0333837 A1 | 12/2013 | Preisler et al. |
| 2013/0341971 A1 | 12/2013 | Masini et al. |
| 2014/0077518 A1 | 3/2014 | Preisler et al. |
| 2014/0077530 A1 | 3/2014 | Preisler et al. |
| 2014/0077531 A1 | 3/2014 | Preisler et al. |
| 2014/0154461 A1 | 6/2014 | Preisler et al. |
| 2014/0225296 A1 | 8/2014 | Preisler et al. |
| 2014/0335303 A1 | 11/2014 | Preisler et al. |
| 2015/0130105 A1 | 5/2015 | Preisler et al. |
| 2015/0130220 A1 | 5/2015 | Preisler et al. |
| 2015/0130221 A1 | 5/2015 | Preisler et al. |
| 2015/0130222 A1 | 5/2015 | Preisler et al. |
| 2015/0132532 A1 | 5/2015 | Preisler et al. |
| 2016/0059446 A1 | 3/2016 | Lofgren |

OTHER PUBLICATIONS

Office Action; U.S. Appl. No. 14/603,413; notification date Apr. 23, 2015.
Notice of Allowance and Fee(S) Due; related U.S. Appl. No. 14/087,563; date of mailing Mar. 3, 2016.
Corrected Notice of Allowability; related U.S. Appl. No. 14/603,401; dated Jun. 23, 2016.
Office Action; related U.S. Appl. No. 14/603,418; dated Jun. 16, 2016.
Notice of Allowance and Fee(S) Due; related U.S. Appl. No. 14/444,164; dated Jul. 15, 2016.
Office Action; related U.S. Appl. No. 14/603,397; dated Jul. 21, 2016.
Notice of Allowance and Fee(S) Due; related U.S. Appl. No. 14/087,591; date mailed Mar. 12, 2015.
Non-Final Office Action, related U.S. Appl. No. 13/762,879; dated Feb. 13, 2015.
Non-Final Office Action, related U.S. Appl. No. 13/479,974; dated Feb. 13, 2015.
Notice of Allowance and Fee(S) Due; related U.S. Appl. No. 13/603,552; dated Feb. 18, 2015.
Office Action; Related U.S. Appl. No. 13/479,974; Date of mailing Oct. 15, 2014.
Office Action; related U.S. Appl. No. 13/479,974; date of mailing Mar. 20, 2014.
Office Action; related U.S. Appl. No. 13/686,362; date of mailing Mar. 25, 2014.
Office Action; related U.S. Appl. No. 13/523,253; date of mailing Mar. 25, 2014.
Office Action; related U.S. Appl. No. 13/688,972; date of mailing Mar. 28, 2014.
Office Action; related U.S. Appl. No. 13/687,232; date of mailing Mar. 28, 2014.
Office Action; related U.S. Appl. No. 13/689,809; date of mailing Mar. 31, 2014.
Office Action; related U.S. Appl. No. 13/687,213; date of mailing Mar. 31, 2014.
Office Action; related U.S. Appl. No. 13/690,265; date of mailing Mar. 31, 2014.
Office Action; related U.S. Appl. No. 13/762,904; date of mailing Apr. 8, 2014.
Office Action; related U.S. Appl. No. 13/762,800; date of mailing Apr. 8, 2014.
Office Action; related U.S. Appl. No. 13/762,861; date of mailing Apr. 9, 2014.
Office Action; related U.S. Appl. No. 13/690,566; date of mailing Apr. 9, 2014.
Office Action; related U.S. Appl. No. 13/762,832; date of mailing Apr. 11, 2014.
Office Action; related U.S. Appl. No. 13/762,921; date of mailing Apr. 14, 2014.
Notice of Allowance; related U.S. Appl. No. 13/686,388; date of mailing Apr. 15, 2014.
Related U.S. Appl. No. 13/690,566, filed Nov. 30, 2012.
Related U.S. Appl. No. 13/762,921, filed Feb. 8, 2013.
Related U.S. Appl. No. 13/762,956, filed Feb. 8, 2013.
Office Action; related U.S. Appl. No. 13/453,201 (now USPN 8,690,233); date of mailing Nov. 20, 2013.
Office Action; related U.S. Appl. No. 13/523,209 (now USPN 8,622,456) date of mailing Apr. 29, 2013.
Office Action; related U.S. Appl. No. 14/087,563; notification date Jul. 20, 2015.
Office Action; related U.S. Appl. No. 13/762,879; notification date Jul. 31, 2015.
Notice of Allowance and Fee(S) Due; related U.S. Appl. No. 14/087,579; date mailed Aug. 3, 2015.
Notice of Allowance and Fee(S) Due; related U.S. Appl. No. 14/603,397; date mailed Oct. 17, 2016.
Office Action; related U.S. Appl. No. 14/603,407; notification date Oct. 4, 2016.
Office Action; related U.S. Appl. No. 14/603,430; notification date Sep. 14, 2016.
Office Action; related U.S. Appl. No. 14/603,404; notification date Aug. 25, 2016.
Decision on Appeal mailed Apr. 24, 2017 for U.S. Appl. No. 13/762,956, filed Feb. 8, 2013, 7 pgs.
Notice of Allowance and Fee(s) Due; related U.S. Appl. No. 14/603,404; date mailed Dec. 2, 2016.
Non-Final Office Action; related U.S. Appl. No. 15/337,013; notification date Dec. 27, 2016.
Notice of Allowance and Fee(s) Due; related U.S. Appl. No. 14/603,418; date mailed Dec. 28, 2016.

* cited by examiner

METHOD OF MAKING A SANDWICH-TYPE, COMPRESSION-MOLDED, COMPOSITE COMPONENT HAVING A CELLULOSE-BASED CORE AND IMPROVED SURFACE APPEARANCE

CROSS-REFERENCE TO RELATED APPLICATION

This application is a continuation-in-part of U.S. patent application Ser. No. 13/762,956 filed Feb. 8, 2013.

TECHNICAL FIELD

This invention relates, in general, to methods of making compression-molded, composite components and, in particular, to methods of making sandwich-type, compression-molded, composite components having a cellulose-based core and having improved or enhanced surface appearance.

OVERVIEW

Compression molding has long been used to manufacture plastic parts or components. While widely used to manufacture thermoset plastic parts, compression molding is also used to manufacture thermoplastic parts. The raw materials for compression molding are typically placed in an open, heated mold cavity. The mold is then closed and pressure is applied to force the materials to fill up the entire cavity. A hydraulic ram or punch is often utilized to produce sufficient force during the molding process. The heat and pressure are maintained until the plastic materials are cured.

Two types of plastic compounds frequently used in compression molding are Bulk Molding Compound (BMC) and Sheet Molding Compound (SMC).

In general, compression molding provides good surface finish and can be applied to composite thermoplastics with woven fabrics, randomly oriented fiber mat or chopped strand. One of the problems associated with compression molding is that compression molding is thought to be largely limited to flat or moderately curved parts with no undercuts.

Vacuum during compression molding of thermoset parts has been used to minimize surface defects of the type known as porosity. Porosity is caused by air that is trapped between the molding compound (i.e. raw materials) and the surface of the mold cavity. The mold chamber or cavity is sealed from the surrounding atmosphere and then the chamber is evacuated before pressure is applied to the raw materials.

Sandwich-type composite panels including cores have very important characteristics because of their light weight and high strength. Conventionally, such panels are constructed by sandwiching a core having a large number of cavities and having low strength characteristics between two outer layers or skins, each of which is much thinner than the core but has excellent mechanical characteristics. The core is often made of cells which may be hexagonal in plan shape and they may be honeycombed. Such cores typically have two mutually parallel and opposite faces that are perpendicular to the axes of the cells as shown in FIGS. 1 and 2.

The prior art discloses a method of making a panel of sandwich-type composite structure having a cellular core in a single processing step. In that method, the panel is made by subjecting a pre-heated stack 10 of layers of material (i.e. FIGS. 1 and 2) to cold-pressing in a mold. The stack is made up of: at least a first skin 14 made of a reinforced thermoplastics material, a cellular core 16 made of a thermoplastics material, and a second skin 18 also made of a reinforced thermoplastics material. The stack 10 may also include one or more external covering layers made of a facing material such as woven or nonwoven thermoplastic material as shown in FIG. 1. The stack 10 may be pre-heated outside the mold or heated inside the mold to a softening temperature.

Such a method is particularly advantageous because of the fact that it makes it possible, in a single operation, to generate cohesion and bonding between the various layers of the composite structure, as shown in FIGS. 2 and 3, and to shape the resulting panel (10 or 10') while preserving all of the mechanical properties imparted by the cellular-core, sandwich structure.

One problem associated with the above-noted method of making a panel of sandwich-type composite structure is that during the cold-pressing in a compression mold 20 (i.e. FIG. 4) one or both of the skins 14 and 18 does not fully contact or achieve abutting engagement with its respective mold half or die 24 during the molding process. Consequently, the resulting compression-molded, composite component 10' fails to achieve the desired component shape, as defined by the opposing surfaces of upper and lower dies 24 and 26. In FIG. 4, distance between arrows 15 represent a distance between the desired and actual shapes of the component 10'.

Also, the air sealed within the cellular core 16 bonded to and between the skins 14 and 18 causes circular portions of one or both of the skins 14 to move inwardly into and towards the cells of the core 16 along the axes of the cells as the air cools. This causes the outer surface 22 of one or both of the skins 14 and 18 to be debossed as shown in FIGS. 2 and 3 at 12. Such effect may be termed an "oil-can" effect and results in a pattern of undesirable depressions or imprints 12 on the outer surface 22 of one or both of the skins 14 and 18 as shown in FIGS. 2 and 3. Such undesirable depressions 12 can even be seen in facing material (not shown in FIGS. 2 and 3 but shown in FIG. 1) bonded to the outer surfaces of the skins 14 and 18 such as covering layers thereby resulting in a poor surface finish.

The term "facing material" refers to a material used to conceal and/or protect structural and/or functional elements from an observer. Common examples of facing materials include upholstery, carpeting, and wall coverings (including stationary and/or movable wall coverings and cubicle wall coverings). Facing materials typically provide a degree of aesthetic appearance and/or feel, but they may also provide a degree of physical protection to the elements that they conceal. In some applications, it is desirable that the facing material provide properties such as, for example, aesthetic appeal (for example, visual appearance and/or feel) and abrasion resistance. Facing materials are widely used in motor vehicle construction.

In the automotive industry, it is common practice to refer to various surfaces as being A-, B-, or C-surfaces. As used herein, the term "A-surface" refers to an outwardly-facing surface for display in the interior of a motor vehicle. This surface is a very high visibility surface of the vehicle that is most important to the observer or that is most obvious to the direct line of vision. With respect to motor vehicle interiors, examples include dashboards, instrument panels, steering wheels, head rests, upper seat portions, headliners, load floors and pillar coverings.

The following U.S. patent documents are related to at least one embodiment of the present invention: U.S. Pat. Nos. 5,370,521; 5,502,930; 5,915,445; 6,050,630; 6,102, 464; 6,435,577; 6,537,413; 6,655,299; 6,682,675; 6,682, 676; 6,748,876; 6,790,026; 6,823,803; 6,843,525; 6,890, 023; 6,981,863; 7,090,274; 7,419,713; 7,909,379; 7,919, 031; 8,117,972; 2005/0189674, 2006/0255611; 2008/0185866; 2011/0315310; and 2012/0315429.

SUMMARY OF EXAMPLE EMBODIMENTS

An object of at least one embodiment of the present invention is to provide a method of making sandwich-type, compression-molded, composite components having a cellulose-based core and having enhanced or improved overall surface appearance or finish.

In carrying out the above object and other objects of at least one embodiment of the present invention, a method of making a sandwich-type, compression-molded, composite component having improved surface appearance is provided. The method includes heating a blank or stack of sandwich material including first and second reinforced, thermoplastic skins, first and second sheets of thermoplastic adhesive and a cellulose-based core positioned between the skins and between the sheets. The core has a large number of cavities. The skins, the sheets and the core are heated to a softening temperature of the thermoplastics. A compression mold is provided which includes component-forming, upper and lower dies with opposing molding surfaces cooperating to define a mold cavity having a shape substantially corresponding to a desired shape of the component. The blank or stack is placed on the lower die in an open position of the mold. The dies are moved toward each other until the mold is in a closed position. The heated blank or stack is allowed to cool in the mold cavity in the closed position until inner surfaces of the skins are bonded to top and bottom surfaces of the core by the sheets to seal the core cavities. Air in the sealed cavities urges softened portions of the sheets and portions of the core inwardly towards the cavities of the core as the air in the cavities cools to inhibit debossing and improve surface appearance of a first outer surface of the blank or stack during the step of allowing.

A vacuum may be applied at the first outer surface of the blank or stack in the mold cavity sufficient to prevent debossing and improve appearance of the first outer surface during the step of allowing.

The first outer surface may be an A-surface.

The method may further include sealing the mold cavity from the surrounding atmosphere during the step of applying.

The method may further include applying a vacuum at a second outer surface of the stack or blank in the mold cavity to prevent debossing and improve appearance of the second outer surface during the step of allowing.

The core may be a cellular core such a honeycomb core.

The thermoplastic of the skins may be polypropylene.

The component may have a thickness in the range of 5 to 25 mm.

At least one of the skins may be a woven skin.

The step of heating may be performed outside the mold.

Further in carrying out the above object and other objects of at least one embodiment of the present invention, a method of making a sandwich-type, compression-molded, composite component having improved surface appearance and for use in a vehicle is provided. The method includes heating a blank or stack of sandwich material including first and second reinforced thermoplastic skins, first and second sheets of thermoplastic adhesive and a cellulose-based core positioned between the skins and between the sheets and having a large number of cavities. The skins, the sheets and the core are heated to a softening temperature of the thermoplastics. A compression mold is provided which includes component-forming, upper and lower dies with opposing surfaces cooperating to define a mold cavity having a shape substantially corresponding to a desired shape of the component. The blank or stack is placed on the lower die in an open position of the mold. The dies are moved toward each other until the mold is in a closed position. The heated blank or stack is allowed to cool in the mold cavity in the closed position until inner surfaces of the skins are bonded to top and bottom surfaces of the core by the sheets to seal the core cavities. Air in the sealed cavities urges softened portions of the sheets and portions of the core inwardly towards the cavities of the core as the air in the cavities cools to inhibit debossing and improve surface appearance of a first outer surface of the stack or blank.

A vacuum may be applied at the first outer surface of the stack or blank in the mold cavity sufficient to prevent debossing and improve appearance of the first outer surface during the step of allowing.

The first outer surface may be an A-surface.

The method may further include sealing the mold cavity from the surrounding atmosphere during the step of applying.

The method may further include applying a vacuum at a second outer surface of the stack or blank in the mold cavity to prevent debossing and improve appearance of the second outer surface during the step of allowing.

Still further in carrying out the above object and other objects of at least one embodiment of the present invention, a method of making a sandwich-type, compression-molded, composite component having improved surface appearance for use in the interior of a vehicle is provided. The method includes heating a blank or stack of sandwich material including first and second reinforced thermoplastic skins, first and second sheets of thermoplastic adhesive and a cellulose-based core positioned between the skins and between the sheets and having a large number of cavities. The skins, the sheets and the core are heated to a softening temperature of the thermoplastics. A compression mold is provided which includes component-forming, upper and lower dies with opposing molding surfaces cooperating to define a mold cavity having a shape substantially corresponding to a desired shape of the component. The blank or stack is placed on the lower die in an open position of the mold. The dies are moved toward each other until the mold is in a closed position. The heated blank or stack is allowed to cool in the mold cavity in the closed position until inner surfaces of the skins are bonded to top and bottom surfaces of the core by the sheets to seal the core cavities. Air in the sealed cavities urges softened portions of the sheets and portions of the core inwardly towards the cavities of the core as the air in the cavities cools to inhibit debossing and improve surface appearance of a first outer surface of the stack or blank.

A vacuum may be applied at the first outer surface of the stack or blank in the mold cavity sufficient to prevent debossing and improve appearance of the first outer surface during the step of allowing.

The method may further include applying a vacuum at a second outer surface of the stack or blank in the mold cavity to prevent debossing and improve appearance of the second outer surface during the step of allowing.

Other technical advantages will be readily apparent to one skilled in the art from the following figures, descriptions and claims. Moreover, while specific advantages have been enumerated, various embodiments may include all, some or none of the enumerated advantages.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 5:
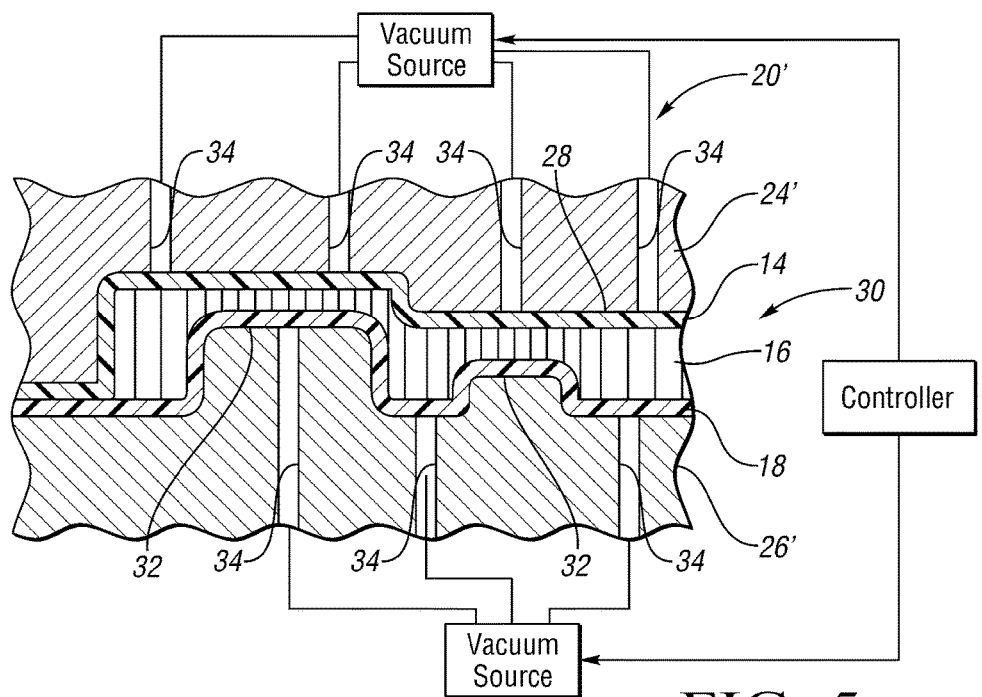
FIG. 5 is a view, similar to the view of FIG. 4, but showing a vacuum-assisted compression mold useful in at least one method embodiment of the present invention to improve the surface appearance of the resulting component.

FIG. 5 shows a compression-molded, composite component, generally indicated at 30, which may be used in a vehicle load floor assembly, positioned or supported at the rear of an automotive vehicle. The composite component 30 has a sandwich structure. The composite component 30 includes a load-bearing, first outer skin or layer 14 having an A-surface 28, a second outer skin or layer 18 having a surface 32, and a core 16 positioned between and bonded to the outer layers 14 and 18. The core 16 has a large number of cavities and is preferably a thermoplastic core 16. The outer layers 14 and 18 are bonded to the core 16 by press molding in a mold 20' typically after pre-heating the outer layers 14 and 18 and the core 16 outside the mold 20'. The outer layers 14 and 18 are preferably fiber-reinforced thermoplastic layers. The thermoplastic of the layers 14 and 18 and the core 16 may be a polyolefin such as polypropylene. The thermoplastic may alternatively be polyurethane. The fiber-reinforcement may be a glass mat, a natural fiber mat, or a woven or non-woven mat.

The core 16 may be a cellular core having a honeycomb structure. The core 16 may also be made of polypropylene honeycomb, aluminum honeycomb, balsa and polyurethane foam. The resulting composite component or panel 30 typically includes a lightweight, low density core such as the core 16 together with fiber-reinforced thermoplastic skins or layers such as the skins 14 and 18. The resulting component 30 is not debossed and has an improved, overall appearance unlike the components 10 and 10' of FIGS. 2 and 3, respectively.

The composite component 30 may be compression or press molded using a variety of technologies which use a low temperature, compression-molding apparatus but preferably uses the molding apparatus of FIG. 5. The core 16 and the skins 14 and 18 are preferably generally of the type shown in U.S. Pat. Nos. 6,537,413; 6,050,630; and 2005/0189674.

Each resulting panel or component 30 may have a thickness in the range of 5 to 25 mm.

In one example method of making the component 30, a stack of material is pressed in the low pressure, cold-forming mold 20' which has upper and lower forming dies 24' and 26', respectively. The mold 20' is shown in its closed position in FIG. 5 but it is to be understood that the blank or stack of materials is placed on the lower die 26' in the open position of the mold 20' prior to cold pressing.

The stack is made up of the first layer or skin 14, the cellular core 16 and the second layer or skin 18. The stack is pressed at a pressure lying in the range of $10 \times 10^5$ Pa. to $30 \times 10^5$ Pa. The first and second skins 14 and 18, respectively, are preferably pre-heated to make them malleable and stretchable. Advantageously, in order to soften the first and second skins 14 and 18, respectively, heat is applied to a pre-assembly constituted by the stack made up of at least the first skin 14, of the cellular core 16, and the second skin 18 so that, while the component 30 is being formed in the mold 20', the first and second skins 14 and 18 have a forming temperature lying approximately in the range of 160° C. to 200° C., and, in this example, about 180° C.

Figure 1:
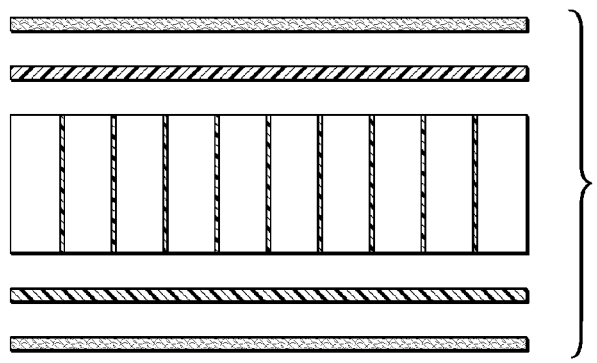
FIG. 1 is a side sectional view showing various separate layers of a prior art stack or blank of thermoplastic-based layers of material.
Figure 2:
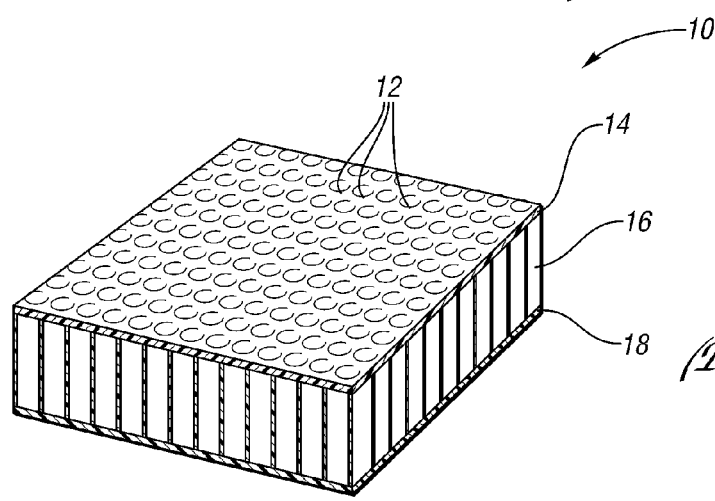
FIG. 2 is a top perspective sectional view of the stack of FIG. 1 but without outer carpet layers after low-pressure, cold compression molding of the prior art.
Figure 3:
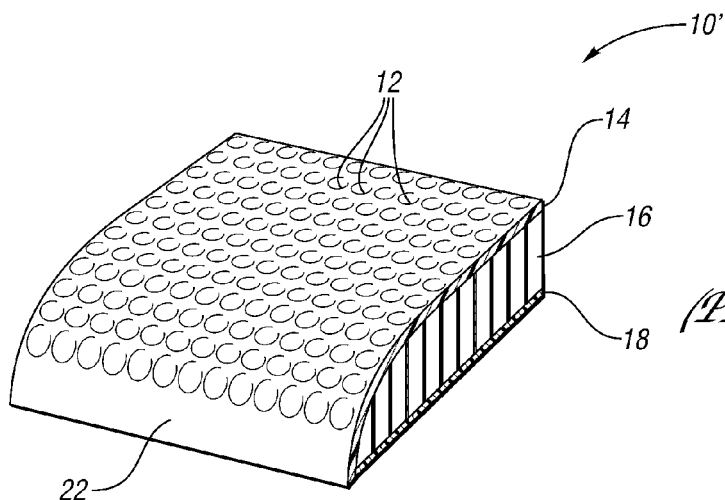
FIG. 3 is a view, similar to the view of FIG. 2, of an edge portion of the molded component.

The heated blank or stack is allowed to cool in the mold cavity of FIG. 5 in the closed position of the mold 20' until inner surfaces of the skins 14 and 18 are bonded to top and bottom surfaces of the core 16 to seal the cavities of the core 16. The air in the sealed cavities normally urges softened portions of the skins 14 and 18 inwardly into and towards the cavities of the core 16 as the air in the cavities cools. A vacuum is applied at the first outer surface 28 of the blank or stack by an upper vacuum source through holes or passageways 34 formed through the upper die 24' of the mold 20' sufficient to prevent debossing (as shown in FIGS. 2 and 3) during the cooling and improve appearance of the first outer surface 28. Vacuum is applied by the upper vacuum source under control of a controller.

In like fashion, a vacuum is applied at the second outer surface 32 of the stack or blank by a lower vacuum source through holes or passageways 34 formed through the lower die 26' of the mold 20' to prevent debossing during the cooling and improve appearance of the second outer surface 32. Vacuum is applied by the lower vacuum source under control of the controller.

The mold cavity of the mold 20' is preferably sealed from the atmosphere surrounding the mold 20' during the application of the vacuum at the upper and lower surfaces 28 and 32, respectively, by one or both of the skins 14 and 18 or by a separate, conventional seal (not shown) between the dies 24' and 26' of the mold 20'.

Figure 6:
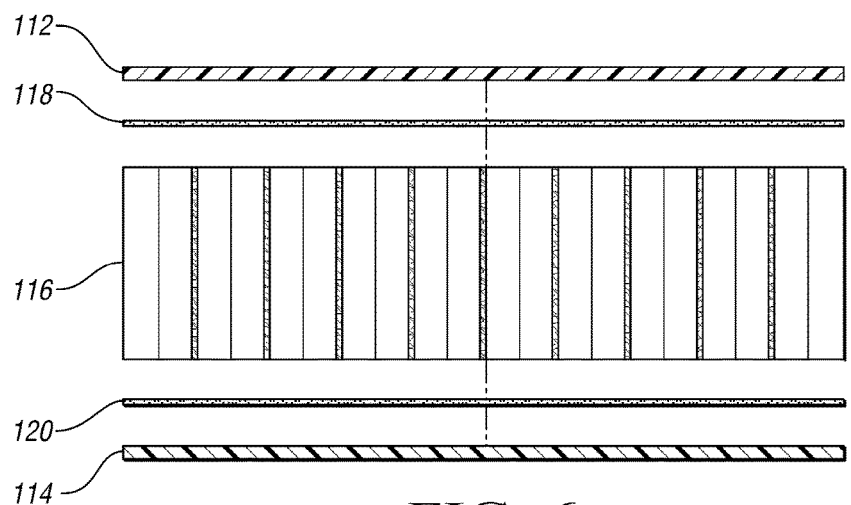
FIG. 6 is a side sectional view showing a stack of various separate sheets or layers of thermoplastic-based and cellulose-based material prior to being compression molded into a composite component having a sandwich structure.
Figure 7:
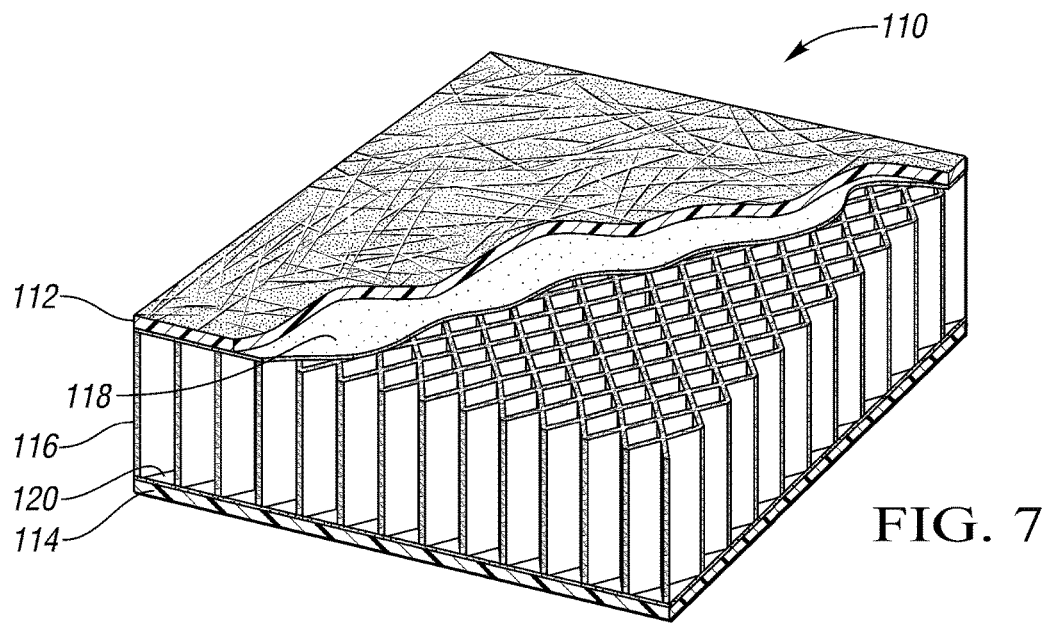
FIG. 7 is a top perspective view, partially broken away and in cross section, of the composite component of FIG. 6 after molding.
Figure 8:
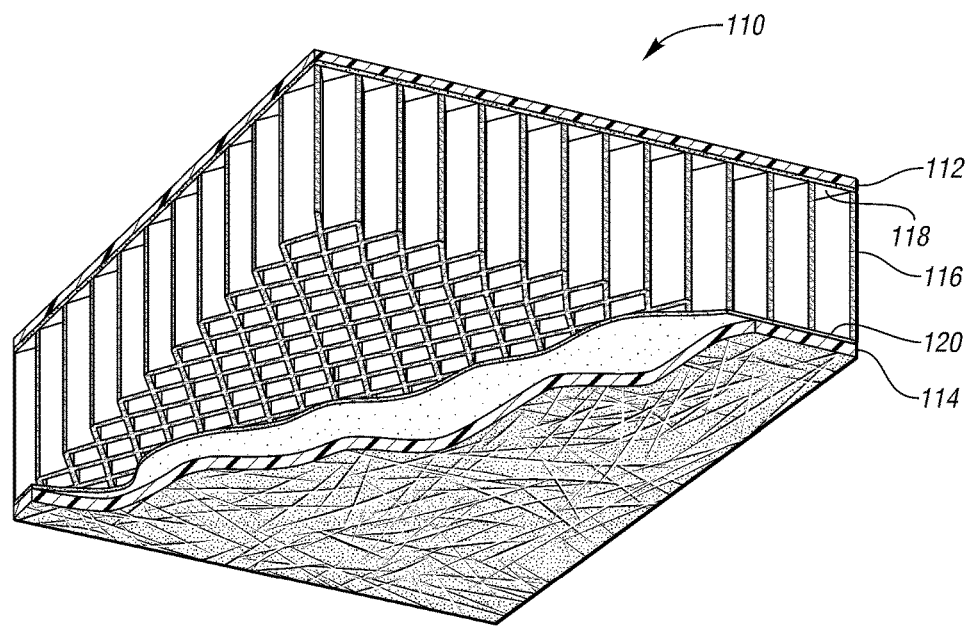
FIG. 8 is a view similar to the view of FIG. 7 but providing a bottom perspective view.

Referring now to the FIGS. 7 and 8, a second embodiment of a compression-molded, sandwich-type composite component, generally indicated at 110, is shown. FIG. 6 shows a stack of thermoplastic-based and cellulose-based sheets or layers of material prior to the stack being compression molded into the composite panel or component 110. It is to be understood that one or more of such panels or components constructed in accordance with at least one embodiment of the present invention may be used in a wide variety of environments including an automotive vehicle environment. For example, the panel or component 110 may be a load-bearing vehicle component as shown or an interior trim component.

Figure 4:
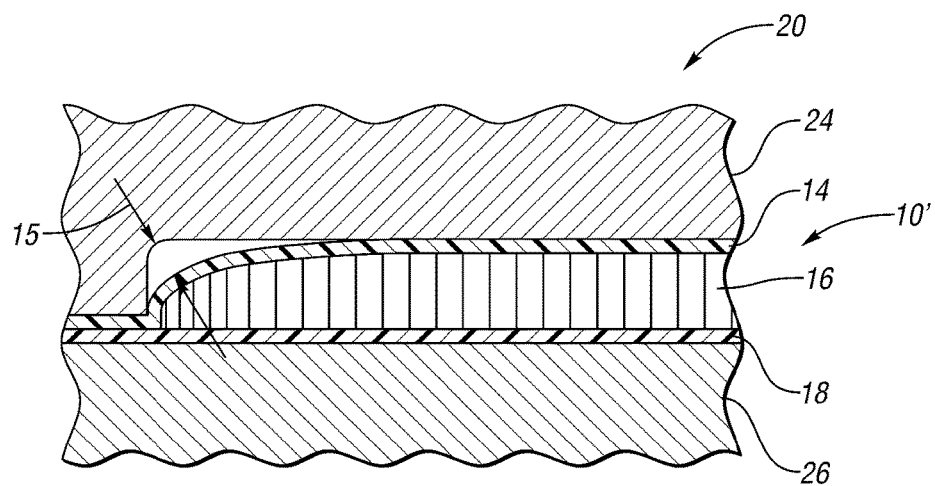
FIG. 4 is a view, partially broken away and in cross section, of the component of FIG. 3 during compression molding in accordance with the prior art.

The component 110 is typically manufactured via a thermo-compression process by providing the stack of material located or positioned within a low pressure, thermo-compression mold either generally of the type shown at 20 in FIG. 4 (without vacuum) or generally of the type shown at 20' in FIG. 5 (with vacuum). As shown in FIG. 6, the stack includes first and second reinforced thermoplastic skins or outer layers 112 and 114, respectively, a cellulose-based core having a large number of cavities such as a paper or cardboard cellular core 116 disposed between and bonded to plys or films or sheets of hot-melt adhesive (i.e. thermoplastic adhesive) 118 and 120 which, in turn, are disposed between and bonded to the skins 112 and 114 by the press or compression molding. The sheets 118 and 120 may be bonded to their respective skins 112 and 114 prior to the press molding or are preferably bonded during the press molding. The thermoplastic of the sheets 118 and 120 is typically compatible with the thermoplastic of the skins 112 and 114 so that a strong bond is formed therebetween. One or more other resins may also be included within the adhesive of the sheets 118 and 120 to optimize the resulting adhesive system. The adhesive system is not a solvent-based adhesive system.

The skins 112 and 114 and their respective sheets or film layers 118 and 120 (with the core 116 in between the layers 118 and 120) are heated typically outside of the mold (i.e. in an oven) to a softening temperature wherein the hot-melt adhesive becomes sticky or tacky. The mold is preferably a low-pressure, compression mold which performs a thermo-compression process on the stack of materials.

Figure 9:
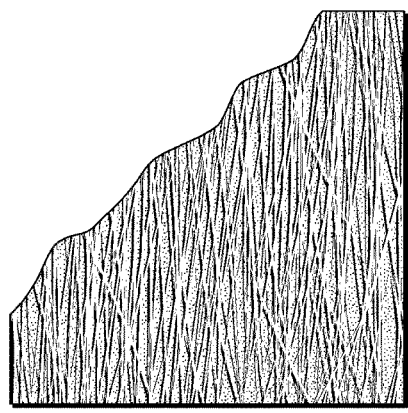
FIG. 9 is a top plan view, partially broken away, of a reinforced thermoplastic skin having substantially parallel, visible fibers.
Figure 10:
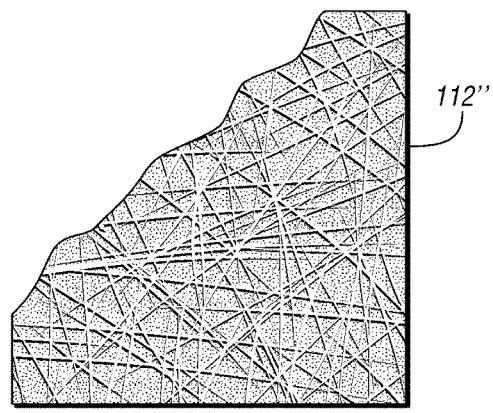
FIG. 10 is a view similar to the view of FIG. 9 but with substantially randomly oriented visible fibers.

The step of applying the pressure compacts and reduces the thickness of the cellular core 116 and top and bottom surface portions of the cellular core 116 penetrate and extend into the film layers 118 and 120 without penetrating into and possibly encountering any fibers located at the outer surfaces of the skins 112 and 114 thereby weakening the resulting bond. Often times the fibers in the skins 112 and 114 are located on or at the surfaces of the skins as shown by skins 112' and 112" in FIGS. 9 and 10, respectively, wherein the fibers are substantially parallel and randomly oriented, respectively.

The cellulose-based, cellular core 116 may be a honeycomb core. In this example, the cellular core has an open-celled structure of the type made up of a tubular honeycomb, and it is made mainly of cellulose and preferably of paper or cardboard. The sticky or tacky hot-melt adhesive extends a small amount into the open cells during the thermo-compression process. It is also possible to use a cellular structure having closed cells, a material, such as a wooden part, to which the top and bottom film layers 118 and 120, respectively, are bonded. The skins 112 and 114 are bonded to the top and bottom surfaces of the core 116 by the sheets 118 and 120 to seal the cavities of the core 116. Air in the sealed cavities urges softened portions of the sheets 118 and 120 and portions of the core 116 inwardly towards the cavities of the core 116 as the air cools to inhibit debossing and improve surface appearance of a first outer surface of the stack. A mold such as the mold 20' of FIG. 5 (with vacuum) may be used to prevent debossing and improve surface appearance at the first outer surface.

Each of the skins 112 and 114 may be fiber reinforced. The thermoplastic of the sheets or film layers 118 and 120, and the skins 112 and 114 may be polypropylene. Alternatively, the thermoplastic may be polycarbonate, polyimide, acrylonitrile-butadiene-styrene as well as polyethylene, polyethylene terphthalate, polybutylene terphthalate, thermoplastic polyurethanes, polyacetal, polyphenyl sulphide, cyclo-olefin copolymers, thermotropic polyesters and blends thereof. At least one of the skins 112 or 114 may be woven skin, such as polypropylene skin. Each of the skins 112 and 114 may be reinforced with fibers, e.g., glass fibers, carbon fibers, aramid and/or natural fibers. At least one of the skins 112 and 114 can advantageously be made up of woven glass fiber fabric and of a thermoplastics material.

The resulting panel 110 may have a thickness in the range of 5 to 25 mm.

In one example method of making the panel 110, a stack of material may be pressed in a low pressure, cold-forming mold (not shown). The stack is made up of the first skin 112, the first film layer 118, the paper cellular core 116, the second film layer 120 and the second skin 114, and is pressed at a pressure lying in the range of $10 \times 10^5$ Pa. to $30 \times 10^5$ Pa. The first and second skins 112 and 114, and the first and second film layers 118 and 120 are preferably pre-heated to make them malleable and stretchable. Advantageously, in order to soften the first and second skins 112 and 114, and their respective film layers 118 and 120, respectively, heat is applied to a pre-assembly made up of at least the first skin 112, the first film layer 118, the paper cellular core 116, the second skin 114 and the second film layer 120 so that, while the panel 110 is being formed in the mold, the first and second skins 112 and 114 and the film layers 118 and 120 have a forming temperature lying approximately in the range of 160° C. to 200° C., and, in this example, about 180° C.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of making a sandwich-type, compression-molded, composite component having improved surface appearance, the method comprising:

heating a blank or stack of sandwich material including first and second reinforced thermoplastic skins, first and second sheets of thermoplastic adhesive and a cellulose-based core positioned between the skins and between the sheets and having a plurality of cavities, the skins, the sheets and the core being heated to a softening temperature of the thermoplastics;

providing a compression mold including component-forming, upper and lower dies with opposing molding surfaces cooperating to define a mold cavity having a shape substantially corresponding to a desired shape of the component;

placing the blank or stack on the lower die in an open position of the mold;

moving the dies toward each other until the mold is in a closed position; and allowing the heated blank or stack to cool in the mold cavity in the closed position until inner surfaces of the skins are bonded to top and bottom surfaces of the core by the sheets to seal the core cavities, air in the sealed cavities urging softened portions of the sheets and portions of the core inwardly towards the cavities of the core as the air in the cavities cools; and applying a vacuum at the first outer surface of the blank or stack in the mold cavity sufficient to prevent debossing and improve appearance of the first outer surface during the step of allowing.

2. The method as claimed in claim 1, wherein the first outer surface is an A-surface.

3. The method as claimed in claim 1, further comprising sealing the mold cavity from the surrounding atmosphere during the step of applying.

4. The method as claimed in claim 1, further comprising applying a vacuum at a second outer surface of the stack or blank in the mold cavity to prevent debossing and improve appearance of the second outer surface during the step of allowing.

5. The method as claimed in claim 1, wherein the core is a cellular core.

6. The method as claimed in claim 5, wherein the cellular core is a honeycomb core.

7. The method as claimed in claim 1, wherein each of the skins is fiber reinforced.

8. The method as claimed in claim 1, wherein the thermoplastic of the skins is polypropylene.

9. The method as claimed in claim 1, wherein the component has a thickness in the range of 5 to 25 mm.

10. The method as claimed in claim 1, wherein at least one of the skins is a woven skin.

11. The method as claimed in claim 1, wherein the step of heating is performed outside the mold.

12. A method of making a sandwich-type, compression-molded, composite component having improved surface appearance and for use in a vehicle, the method comprising:

heating a blank or stack of sandwich material including first and second reinforced thermoplastic skins, first and second sheets of thermoplastic adhesive and a cellulose-based core positioned between the skins and between the sheets and having a plurality of cavities, the skins, the sheets and the core being heated to a softening temperature of the thermoplastics;

providing a compression mold including component-forming, upper and lower dies with opposing molding surfaces cooperating to define a mold cavity having a shape substantially corresponding to a desired shape of the component;

placing the blank or stack on the lower die in an open position of the mold;

moving the dies toward each other until the mold is in a closed position; and allowing the heated blank or stack to cool in the mold cavity in the closed position until inner surfaces of the skins are bonded to top and bottom surfaces of the core by the sheets to seal the core cavities, air in the sealed cavities urging softened portions of the sheets and portions of the core inwardly towards the cavities of the core as the air in the cavities cools; and applying a vacuum at the first outer surface of the stack or blank in the mold cavity sufficient to prevent debossing and improve appearance of the first outer surface during the step of allowing.

13. The method as claimed in claim 12, wherein the first outer surface is an A-surface.

14. The method as claimed in claim 12, further comprising sealing the mold cavity from the surrounding atmosphere during the step of applying.

15. The method as claimed in claim 12, further comprising applying a vacuum at a second outer surface of the stack or blank in the mold cavity to prevent debossing and improve appearance of the second outer surface during the step of allowing.

16. A method of making a sandwich-type, compression-molded, composite component having improved surface appearance for use in the interior of a vehicle, the method comprising:

heating a blank or stack of sandwich material including first and second reinforced thermoplastic skins, first and second sheets of thermoplastic adhesive and a cellulose-based core positioned between the skins and between the sheets and having a plurality of cavities, the skins, the sheets and the core being heated to a softening temperature of the thermoplastics;

providing a compression mold including component-forming, upper and lower dies with opposing molding surfaces cooperating to define a mold cavity having a shape substantially corresponding to a desired shape of the component;

placing the blank or stack on the lower die in an open position of the mold;

moving the dies toward each other until the mold is in a closed position; and allowing the heated blank or stack to cool in the mold cavity in the closed position until inner surfaces of the skins are bonded to top and bottom surfaces of the core by the sheets to seal the core cavities, air in the sealed cavities urging softened portions of the sheets and portions of the core inwardly towards the cavities of the core as the air in the cavities cools; and applying a vacuum at the first outer surface of the stack or blank in the mold cavity sufficient to prevent debossing and improve appearance of the first outer surface during the step of allowing.

17. The method as claimed in claim 16, further comprising applying a vacuum at a second outer surface of the stack or blank in the mold cavity to prevent debossing and improve appearance of the second outer surface during the step of allowing.

* * * * *